United States Patent
Labuschagne

(10) Patent No.: US 7,759,913 B2
(45) Date of Patent: *Jul. 20, 2010

(54) APPARATUS AND METHODS FOR CONTROLLING OPERATION OF A SINGLE-PHASE VOLTAGE REGULATOR IN A THREE-PHASE POWER SYSTEM

(75) Inventor: Casper A. Labuschagne, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/350,429

(22) Filed: Jan. 8, 2009

(65) Prior Publication Data
US 2009/0134854 A1 May 28, 2009

Related U.S. Application Data

(63) Continuation of application No. 11/368,826, filed on Mar. 6, 2006, now Pat. No. 7,504,806.

(60) Provisional application No. 60/728,922, filed on Oct. 21, 2005.

(51) Int. Cl.
G05F 1/14 (2006.01)
H01F 29/04 (2006.01)

(52) U.S. Cl. .......................... 323/255; 323/340; 307/50

(58) Field of Classification Search ......... 323/255–258, 323/340–343; 307/50, 69, 78, 84, 153; 700/296, 700/298, 32–33
See application file for complete search history.

(56) References Cited

U.S. PATENT DOCUMENTS

| 4,686,630 A * | 8/1987 | Marsland et al. ............. 700/296 |
| 5,055,766 A * | 10/1991 | McDermott et al. ......... 323/255 |
| 6,625,570 B2 * | 9/2003 | Pierro et al. ................. 702/188 |

* cited by examiner

*Primary Examiner*—Harry Behm
(74) *Attorney, Agent, or Firm*—Eugene M. Cummings, P.C.

(57) ABSTRACT

Provided are methods for controlling operation of a voltage regulator of a single-phase of a three-phase power system to regulate a measured voltage. One of the methods includes recording a first elapsed time between detecting a first excursion of the measured voltage from an in-band area to an out-of-band area, and a first return of the measured voltage to the in-band area. The method also includes recording a second elapsed time period (dip period) between detecting the first return and a second excursion of the measured voltage from the in-band area to an out-of-band area. If the second elapsed time period is less than a predetermined dip time period, causing a tap position change of the voltage regulator upon expiration of a countdown period initiated upon detecting the first excursion, thereby adjusting the measured voltage to the in-band area while allowing a voltage drop of limited length.

17 Claims, 12 Drawing Sheets

APPARATUS AND METHODS FOR CONTROLLING OPERATION OF A SINGLE-PHASE VOLTAGE REGULATOR IN A THREE-PHASE POWER SYSTEM

CROSS-REFERENCE TO RELATED APPLICATIONS

This application is a continuation of, and claims benefit of U.S. patent application Ser. No. 11/368,826 filed Mar. 6, 2006 now U.S. Pat. No. 7,504,806 entitled "Apparatus and Methods for Controlling Operation of a Single-Phase Voltage Regulator in a Three-Phase Power System" naming Casper A. Labuschagne as the inventor, which claims benefit under 35 U.S.C. §119(e) of U.S. Provisional Application number 60/728,922 entitled "An Apparatus and Methods for Controlling Operation of a Single-Phase Voltage Regulator Operation in a Three-Phase Power System", filed on Oct. 21, 2005, naming Casper A. Labuschagne as inventor, the complete disclosure of each being incorporated by reference. This patent application is related to another patent application entitled "An Apparatus and Methods for Providing a Voltage Reduction for Single Phase Voltage Regulator Operation in a Three-Phase Power System", filed on Oct. 21, 2005, naming Casper A. Labuschagne as inventor.

BACKGROUND OF THE INVENTION

The present invention generally relates to power system control, and more specifically, to an apparatus and method for controlling operation of a single-phase voltage regulator in a three-phase power system.

Electric utility systems or power systems are designed to generate, transmit and distribute electrical energy to loads. In order to accomplish this, power systems generally include a variety of power system elements such as electrical generators, electrical motors, power transformers, power transmission lines, distribution lines, buses and capacitors, to name a few. As a result, power systems must also include a number of regulators having associated control devices, and many protective devices having associated protective schemes to protect the power system elements from abnormal conditions such as electrical short circuits, overloads, frequency-excursions, voltage fluctuations, and the like.

In general, protective devices and their associated protective schemes act to isolate a power system element(s) (e.g., a generator, transformers, buses, motors, etc.) from the remainder of the power system upon detection of the abnormal condition or a fault in, or related to, the power system element (s). Such protective devices may include different types of protective relays, surge protectors, arc gaps and associated circuit breakers and reclosures.

Regulators and their associated control devices are utilized to regulate the voltage level in the power system. For example, a number of single-phase step voltage regulators may be coupled to the various transmission, sub-transmission and distribution lines (collectively, "distribution lines") to enable voltage regulation of the distribution line to, for example 13 kV±10 percent, during a wide range of load conditions (e.g., a plant coming on-line). Such voltage regulators are often placed adjacent to a step-down power transformer and generally include an autotransformer having a single winding (e.g., a series winding), which is tapped at some tap position along the winding to provide a desired voltage flow.

A typical step voltage regulator may have a 100 percent exciting winding in shunt with the distribution line on the source side, and operate to maintain a voltage on the load side of the distribution line. The voltage is maintained within a desired voltage bandwidth by means of a 10 percent tapped buck/boost winding connected in series with the distribution line. The series winding has taps connected to stationary contacts of a tap changer dial switch, where the tap changer dial switch includes a pair of rotatable selector contacts driven by a reversible motor into sequential engagement with the pairs of contacts. For example, the tap changer dial switch may enable an ability to change the effective turns ratio from input to output±10 percent in 32 steps of 5/8 percent each or 0.7 V. A voltage control device monitors the distribution line voltage and current and determines the proper tap position based on the measured distribution line voltage.

Voltage regulators operate via a comparison of an actual measured voltage (i.e., a secondary distribution line voltage) to some internal fixed reference voltage, or center-band voltage. Any voltage difference is amplified and used to control operation of the voltage regulator via the voltage control device. Thus, if the measured voltage is too high or in an out-of-band (OOB) area above a center-band area or center-band voltage range, the voltage regulator is commanded by the voltage control device to execute a tap position change to produce a lower voltage, and if the voltage is too low, or in an OOB area below the center-band area, the voltage regulator is commanded by the voltage control device to execute a tap position change to produce a higher voltage.

Because currents resulting from a fault can easily exceed 10,000 amperes (amps) and because the voltage control device is designed to utilize currents and voltages much less than those of the distribution lines, the currents and voltages are stepped-down via current and voltage transformers, respectively. As is known, the three-phase current and voltages are commonly referred to as the primary current and voltages, while the stepped-down current and voltages are referred to as the secondary current and voltages, respectively. The stepped-down secondary current and voltages are digitized and then utilized by a microcontroller of the voltage control device to determine corresponding phasors representative of the primary current and voltages. The phasors are then used by the microcontroller while executing the voltage control logic scheme of the voltage control device to determine whether a tap position change is required by the voltage regulator (discussed below).

One voltage control scheme commonly referred to as a definite time characteristic, includes setting a countdown timer, referred to herein as a First timer, upon detection of a measured voltage in an OOB area. Such a voltage excursion into the OOB area is determined by comparing a voltage phasor, calculated from secondary voltages provided by the voltage transformer, to the center-band area. If the measured voltage remains in the OOB area during a countdown time period of the First timer, a tap position change is initiated to either lower the load voltage (due to a high OOB voltage) or raise the load voltage (due to a low OOB voltage). If the measured voltage does not remain in the OOB area for the countdown time period, and instead the measured voltage dips in-band momentarily or otherwise, the First timer resets to its countdown time period. The First timer will again begin its countdown time period upon detection of a second voltage excursion into the OOB area. As a result, the elapsed time period of the first voltage excursion into the OOB area is ignored. If the voltage again dips in-band, the First timer, executing the countdown for second time, again resets to it countdown time period. Thus, for cases where the measured voltage is oscillating around the in-band/OOB edge (i.e., dipping in and out of the in-band area), the voltage control device may not issue a needed tap position change command to the voltage regulator due to repeated First timer resets. Accordingly, the feedline voltage is not optimized to the in-band area.

SUMMARY OF THE INVENTION

In accordance with the invention, disclosed are an apparatus and methods to enable improved voltage regulator control, especially for those cases where an occasional momentary load drop occurs or where the measured voltage of the feedline, or distribution line, oscillates around the in-band/OOB edge between one of the OOB areas and the in-band area.

In accordance with an aspect of the invention, an apparatus and method are provided for controlling operation of a voltage regulator via a tap position change where the voltage regulator is operatively coupled to a single-phase of a three-phase power system to regulate a voltage of the single-phase to an in-band area for delivery to a load. The apparatus includes a means for deriving a digitized voltage sample stream representative of a time-varying measured voltage of the single-phase, and a microcontroller operatively coupled to the means for deriving the digitized voltage sample stream. The microcontroller includes, among other things, a microprocessor and a memory operatively coupled to the microprocessor. The microcontroller is programmed to (1) start a countdown time period of a first timer upon detecting a first excursion of the measured voltage from the in-band area to an out-of-band area, or OOB area, (2) upon detecting a first return of the measured voltage to the in-band area, record a first elapsed time of the first timer that is based on a time elapsed between the first excursion and the first return, reset the first timer to the countdown time period, and start a second timer, and (3) upon detecting a second excursion of the measured voltage from the in-band area to the out-of-band area, record a second elapsed time of the second timer that is based on a time elapsed between the first return and the second excursion, and compare the second elapsed time to a predetermined dip time period. If the second elapsed time is less than the predetermined dip time period, the microcontroller is programmed to start an adjusted countdown time period of the first timer, and if the second elapsed time is more than the predetermined dip time period, the microcontroller is programmed to start the countdown time period of the first timer upon subsequent entry of the measured voltage into the OOB area. The adjusted countdown time period is equal to the countdown time period minus a sum of the first and second elapsed times.

In accordance with another aspect of the invention, an apparatus and method are provided for controlling operation of a voltage regulator via a tap position change where the voltage regulator is operatively coupled to a single-phase of a three-phase power system to regulate a voltage of the single-phase to an in-band area for delivery to a load. The apparatus includes a means for deriving a digitized voltage sample stream representative of a time-varying measured voltage of the single-phase, and a microcontroller operatively coupled to the means for deriving the digitized voltage sample stream. The microcontroller includes, among other things, a microprocessor and a memory operatively coupled to the microprocessor. The microcontroller is programmed to (1) start a countdown time period of a first timer upon detecting a first excursion of the measured voltage from the in-band area to an out-of-band area, (2) upon detecting a first return of the measured voltage to the in-band area, start a second timer, and (3) upon detecting a second excursion of the measured voltage from the in-band area to the out-of-band area, record a dip time of the second timer based on a time elapsed between the first return and the second excursion, and compare the dip time to a predetermined dip time period. If the dip time is less than the predetermined dip time period and if there is not a second return of the measured voltage to the in-band area, the microcontroller is programmed to cause the tap position change of the voltage regulator upon expiration of the countdown time period. The tap position change adjusts the measured voltage from the out-of-band area to the in-band area.

In accordance with yet another aspect of the invention, an apparatus and method are provided for controlling operation of a voltage regulator via a tap position change where the voltage regulator is operatively coupled to a single-phase of a three-phase power system to regulate a voltage of the single-phase to an in-band area for delivery to a load. The apparatus includes a means for deriving a digitized voltage sample stream representative of a time-varying measured voltage of the single-phase, and a microcontroller operatively coupled to the means for deriving the digitized voltage sample stream. The microcontroller includes, among other things, a microprocessor and a memory operatively coupled to the microprocessor. The microcontroller is programmed to (1) start a countdown time period upon detecting a first excursion of the measured voltage from the in-band area to an out-of-band area, (2) periodically sample and store the measured voltages as a plurality of measured voltage samples, (3) upon expiration of the countdown time period, calculate a measured percentage time based on the plurality of measured voltage samples stored during the countdown window and (4) compare the measured percentage time to a first threshold percentage time value. The comparison of the measured percentage time to the first threshold percentage time value determinative of whether the tap position change of the voltage regulator is needed. The measured percentage time equals a percentage of time over the countdown time period that the measured voltage is in one of the out-of-band voltage ranges, or the percentage of time over the countdown time period that the measured voltage is in the in-band voltage range.

In accordance with a further aspect of the invention, an apparatus and method are provided for controlling operation of a voltage regulator via a tap position change where the voltage regulator is operatively coupled to a single-phase of a three-phase power system to regulate a voltage of the single-phase to an in-band area for delivery to a load. The apparatus includes a means for deriving a digitized voltage sample stream representative of a time-varying measured voltage of the single-phase, and a microcontroller operatively coupled to the means for deriving the digitized voltage sample stream. The microcontroller includes, among other things, a microprocessor and a memory operatively coupled to the microprocessor. The microcontroller is programmed to (1) start a countdown time period upon detecting a first excursion of the measured voltage from the in-band area to an out-of-band area, (2) periodically sample and store the measured voltages as a plurality of measured voltage samples, (3) upon expiration of the countdown time period, calculate an averaged measured voltage value based on the plurality of measured voltage samples, and (4) compare the averaged measured voltage value to a first threshold voltage value. The comparison of the averaged measured voltage value to the first threshold voltage value is determinative of whether a tap position change of the voltage regulator is needed. The averaged measured voltage value is based on a sum of the magnitudes of the plurality of measured voltage samples stored during the countdown time period, divided by the number of the plurality of measured voltage samples.

In accordance with yet a further aspect of the invention, a method is provided for controlling operation of a voltage regulator via a tap position change where the voltage regulator is operatively coupled to a single-phase of a three-phase power system to regulate a voltage of the single-phase to an in-band area for delivery to a load. The method includes recording a first elapsed time period between detecting a first excursion of the measured voltage from the in-band area to an out-of-band area and detecting a first return of the measured voltage to the in-band area. The first excursion initiates a first countdown time period. The method also includes recording a second elapsed time period between detecting the first return of the measured voltage to the in-band area and a second excursion of the measured voltage from the in-band area to an out-of-band area, comparing the second elapsed time period to a predetermined dip time period, and if the second elapsed time period is less than the predetermined dip time period and if a second return of the measured voltage to the in-band area is not detected, causing the tap position change of the voltage regulator upon expiration of the first countdown time period. If the second elapsed time period is more than the predetermined dip time period and if a second return of the measured voltage to the in-band area is not detected, the method further includes causing a tap position change of the voltage regulator upon expiration of a second countdown time period initiated upon the second excursion. The tap position change adjusts the measured voltage from the out-of-band area to the in-band area.

In accordance with a still further aspect of the invention, a method is provided for controlling operation of a voltage regulator via a tap position change where the voltage regulator is operatively coupled to a single-phase of a three-phase power system to regulate a voltage of the single-phase to an in-band area for delivery to a load. The method includes periodically sampling and storing a plurality of measured voltage samples representative of a plurality of the measured voltages of the single-phase upon detecting a first excursion of the measured voltage from the in-band area to an out-of-band area, and upon expiration of a countdown time period started upon detecting the first excursion, comparing a calculated value to a first threshold percentage time value to determine whether the tap position change of the voltage regulator is needed. The calculated value is based on a comparison of the plurality of measured voltage samples stored during the countdown time period and the countdown time period. The calculated value may be (A) a measured percentage time equal to a percentage of time over the countdown time period that the measured voltage is in one of either the in-band area or in one of the out-of-band areas, or (B) an averaged measured voltage value equal to a sum of the magnitudes of the plurality of measured voltage samples divided by the number of the plurality of measured voltage samples. The sum may include all of the measured voltage samples or a portion of the measured voltage samples.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE INVENTION

An apparatus and methods are provided in a voltage control device for controlling operation of a single-phase voltage regulator in a three-phase power system. As noted above, one drawback when implementing the definite time characteristic is that a First countdown timer resets each time the measured voltage leaves the OOB area and "dips" back into the in-band area; even if that dip is momentary. According to an embodiment of the invention, an adaptive time characteristic is provided that permits one dip back into the in-band area during a countdown time period without affecting the countdown time period of the First timer. As a result, the adaptive time characteristic addresses the problem of multiple start/stop timing sequences resulting from single large loads (such as arc furnaces) causing the measured voltage to momentarily dip in-band, thereby resetting the First timer and delaying an adjustment to a tap position of the voltage regulator to drive the measured voltage back into the desired in-band area.

As noted above, another drawback of the definite time characteristic is that when the measured voltage oscillates around a band edge, dipping in and out of the in-band area, the voltage regulator may never operate or may experience delayed operation due to resetting of the First timer. According to another embodiment of the invention, a percentage time characteristic is provided to enable a tap change position upon expiration of the countdown time period of the First timer under certain conditions. A tap position change is enabled if, after a first excursion into the OOB area, the percentage of time the measured voltage over the countdown time period is in the OOB area more than a selected percentage of time, or more than "a first threshold percentage time value". The percentage of time the measured voltage over the countdown time period is in the OOB area (or in the in-band area, depending on enablement) is herein referred to as "a measured percentage time". Unlike the adaptive time characteristic that allows only one dip back into the in-band area, the percentage time characteristic places no restriction on the number of dips into the in-band area over the countdown time period.

According to yet another embodiment of the invention, an average voltage characteristic is provided to enable a tap change position upon expiration of a countdown time period of the First timer if the average measured voltage value over the countdown time period exceeds a threshold voltage value, after a first excursion into the out-of-band area. Unlike the adaptive time characteristic that allows only one dip back into the in-band area, the average voltage characteristic places no restriction on the number of dips into the in-band area.

Figure 1:
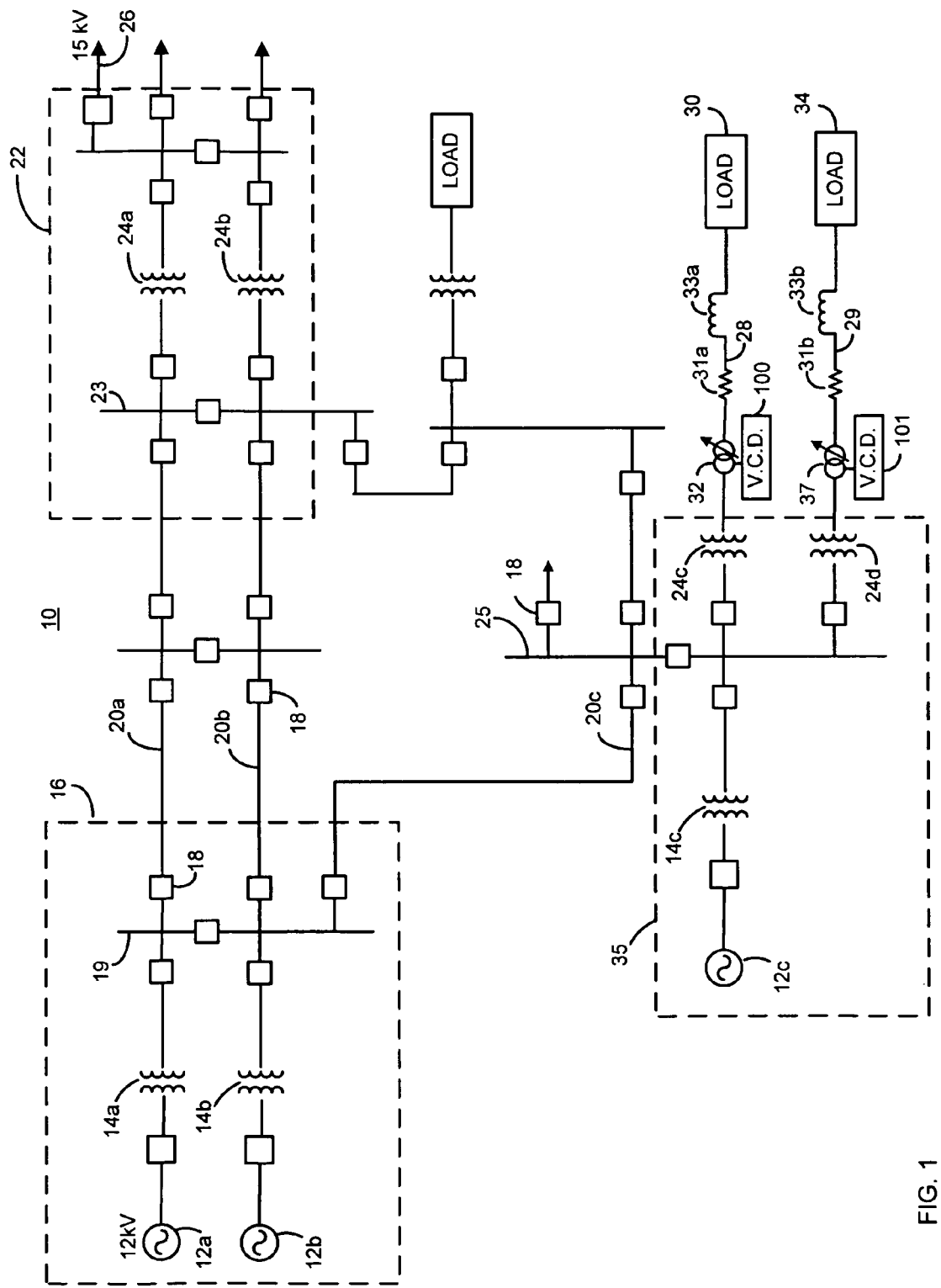
FIG. 1 is a single line schematic diagram of a power system that may be utilized in a typical wide area.

FIG. 1 is a single line schematic diagram of a power system 10 that may be utilized in a typical wide area. As illustrated in FIG. 1, the power system 10 includes, among other things, three generators 12a, 12b and 12c, configured to generate three-phase sinusoidal waveforms such as 12 kV sinusoidal waveforms, three step-up power transformers 14a, 14b and 14c, configured to increase the generated waveforms to a higher voltage sinusoidal waveforms such as 138 kV sinusoidal waveforms and a number of circuit breakers 18. The step-up power transformers 14a, 14b, 14c operate to provide the higher voltage sinusoidal waveforms to a number of long distance transmission lines such as the transmission lines 20a, 20b and 20c. In an embodiment, a first substation 16 may be defined to include the two generators 12a and 12b, the two step-up power transformers 14a and 14b and associated circuit breakers 18, all interconnected via a first bus 19. A second substation 35 may be defined to include the generator 12c, the step-up power transformer 14c and associated circuit breakers 18, all interconnected via a second bus 25. At the end of the long distance transmission lines 20a, 20b, a third substation 22 includes two step-down power transformers 24a and 24b configured to transform the higher voltage sinusoidal waveforms to lower voltage sinusoidal waveforms (e.g., 15 kV) suitable for distribution via one or more distribution lines.

As illustrated, the second substation 35 also includes two step-down power transformers 24c and 24d on respective distribution lines 28 and 29 to transform the higher voltage sinusoidal waveforms, received via the second bus 25, to lower voltage sinusoidal waveforms. A (line) voltage regulator 32 is included on the load side of the power transformer 24c to provide voltage regulation for the load 30, and a voltage regulator 37, identically configured and operable as the voltage regulator 32, is included on the load side of the power transformer 24d to provide voltage regulation to the load 34. For example, the voltage regulator 32 may be designed to provide 13 kV±10% for distribution via an A-phase distribution line 28 to the load 30.

Voltage control devices 100 and 101 are operatively coupled to respective voltage regulators 32, 37, and execute a voltage control scheme (discussed below), to provide control for their associated voltage regulators 32, 37. Although illustrated as a single line schematic diagram for ease of discussion, it should be noted that each of the A-, B- and C-phase distribution lines may include a single-phase voltage regulator such as the voltage regulator 32 and an associated voltage control device such as the voltage control device 100.

Figure 2:
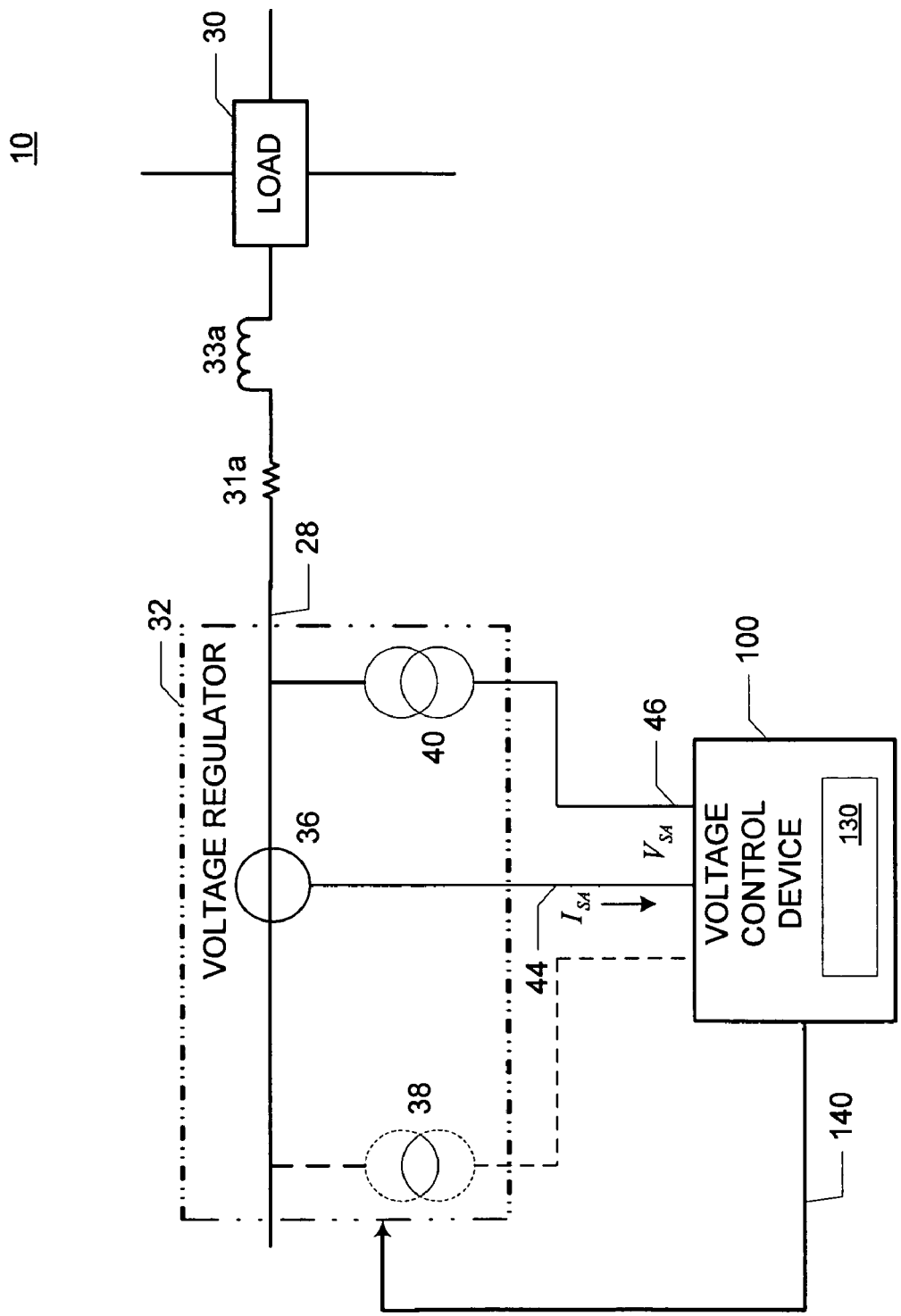
FIG. 2 is a schematic diagram illustrating a configuration of the voltage regulator with voltage control device of FIG. 1, according to an embodiment of the invention.

FIG. 2 is a schematic diagram illustrating a configuration of the voltage regulator 32 with the voltage control device 100, according to an embodiment of the invention. As noted above, each phase distribution line of the A-, B- and C-phase power system may include its own voltage regulator and voltage control device. For ease of discussion and example however, the voltage regulator 32 and the voltage control device 100 are operatively coupled to an A-phase distribution line 28.

As was also noted above, because the voltage control device 100 is designed to utilize currents and voltages much less than those of a distribution line such as, for example, the A-phase distribution line 28, transformers are provided. In the illustrated example, the voltage control device 100 is coupled to the A-phase distribution line 28 via one current transformer 36 and one voltage transformer 40. The voltage transformer 40 is used to step-down the power system voltage to a secondary voltage waveform $V_{SA}$ 46 having a magnitude that can be readily monitored and measured by the voltage control device 100 (e.g., to step-down the distribution line voltage from 13 kV to 120 V). Similarly the current transformer 36 is utilized to proportionally step-down the power system line current to a secondary current $I_{SA}$ 44 having a magnitude that can be readily monitored and measured by the voltage control device 100 (e.g., step-down the distribution line current from 200 amps to 0.2 amps). A second voltage transformer 38 may also be included for use during a reverse load condition (i.e., a generator is switched in on the load side). As shown, each of the current transformer 36 and the voltage transformer(s) 40 are included in the voltage regulator 32, however other arrangements of the voltage regulator 32, the voltage control device 100 and associated transformers are contemplated.

Figure 3:
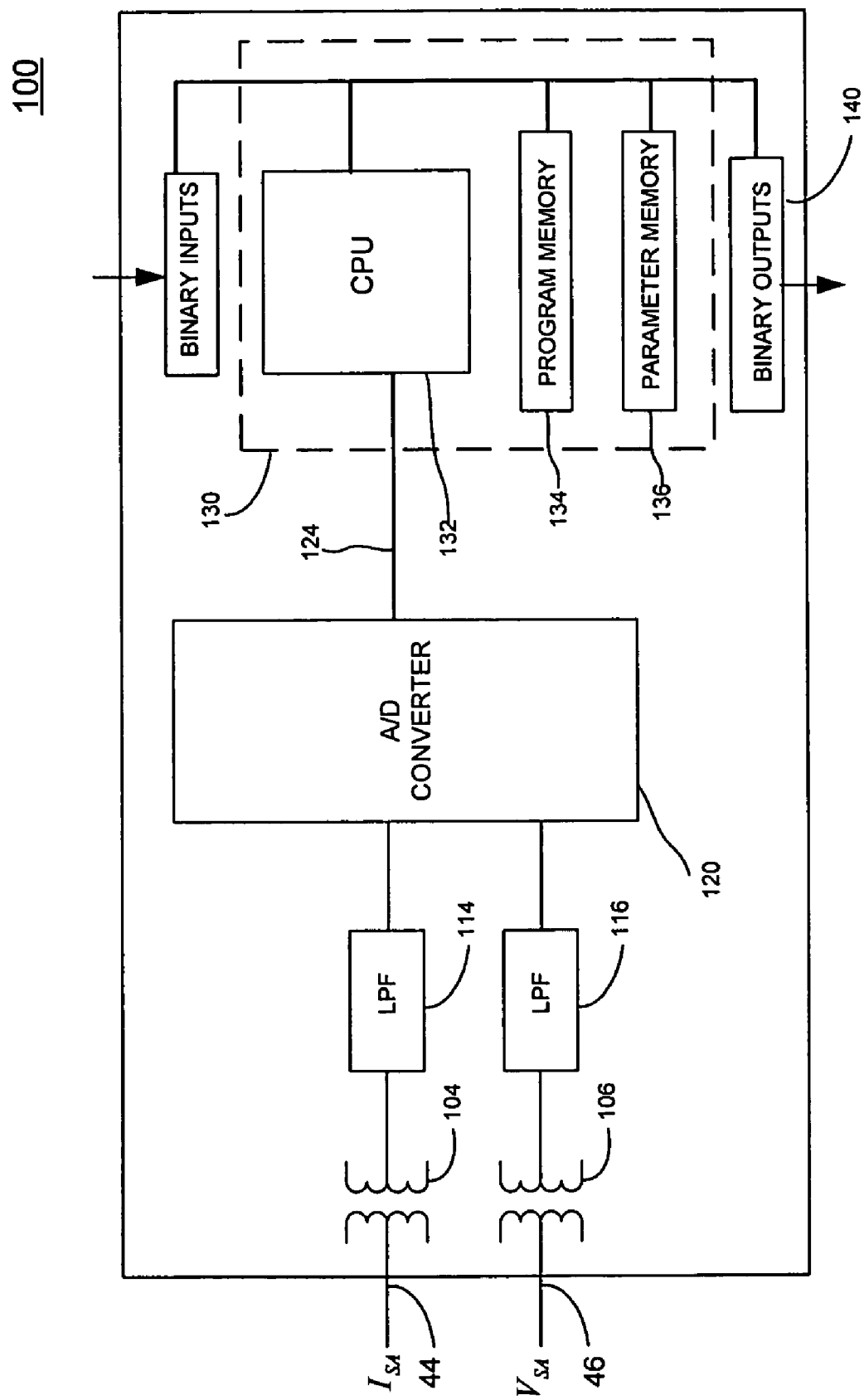
FIG. 3 is a block diagram of an exemplary configuration of the voltage control device of FIG. 2.

When received by the voltage control device 100, the A-phase secondary current and A-phase-to-ground voltage are filtered, processed and utilized by a microcontroller 130 to calculate phasors having corresponding magnitudes and phase angles. The phasors are used by the microcontroller 130 to determine whether a tap change is needed to adjust the load voltage back into the center-band (e.g., adjust to 120 V) FIG. 3 is a block diagram of an exemplary configuration of the voltage control device 100. During operation of the voltage control device 100, the secondary current waveform $I_{SA}$ 44 resulting from the current transformer 36 is further transformed into a corresponding voltage waveform via a current transformer 104 and a resistor (not separately illustrated), and filtered via an analog low pass filter 114. The secondary voltage waveform $V_{SA}$ 46 resulting from the voltage transformer 40 is similarly processed and filtered via another analog low pass filter 116. An analog-to-digital (A/D) converter 120 then multiplexes, samples and digitizes the filtered secondary current and secondary voltage waveforms to form a corresponding digitized current and voltage signal 124.

The corresponding digitized current and voltage signal 124 is received by a microcontroller 130, where it is digitally filtered via, for example, Cosine filters to eliminate DC and unwanted frequency components. In an embodiment, the microcontroller 130 includes a CPU, or a microprocessor 132, a program memory 134 (e.g., a Flash EPROM) and a parameter memory 136 (e.g., an EEPROM). As will be appreciated by those skilled in the art, other suitable microcontroller configurations (or FPGA configurations) may be utilized. Further, although discussed in terms of a microcontroller, it should be noted that the embodiments presented and claimed herein may be practiced using an FPGA or other equivalent.

The microprocessor 132, executing a computer program or voltage control logic scheme (discussed below in connection to FIG. 4), processes (each of) the digitized current and voltage signal 124 to extract phasors representative of a corresponding measured secondary voltage $V_{SA}$ 46 and current $I_{SA}$ 44, and then performs various calculations using the phasors to determine whether the measured secondary voltage $V_{SA}$ 46 is in either of the first or second OOB areas 154, 156. If such an OOB condition occurs, the microprocessor 132 issues a tap change command to the voltage regulator 32 to cause a tap change (i.e., change the effective turns ratio) to adjust the A-phase-to-ground voltage to the desired center-band voltage 153, or reference voltage.

Figure 4:
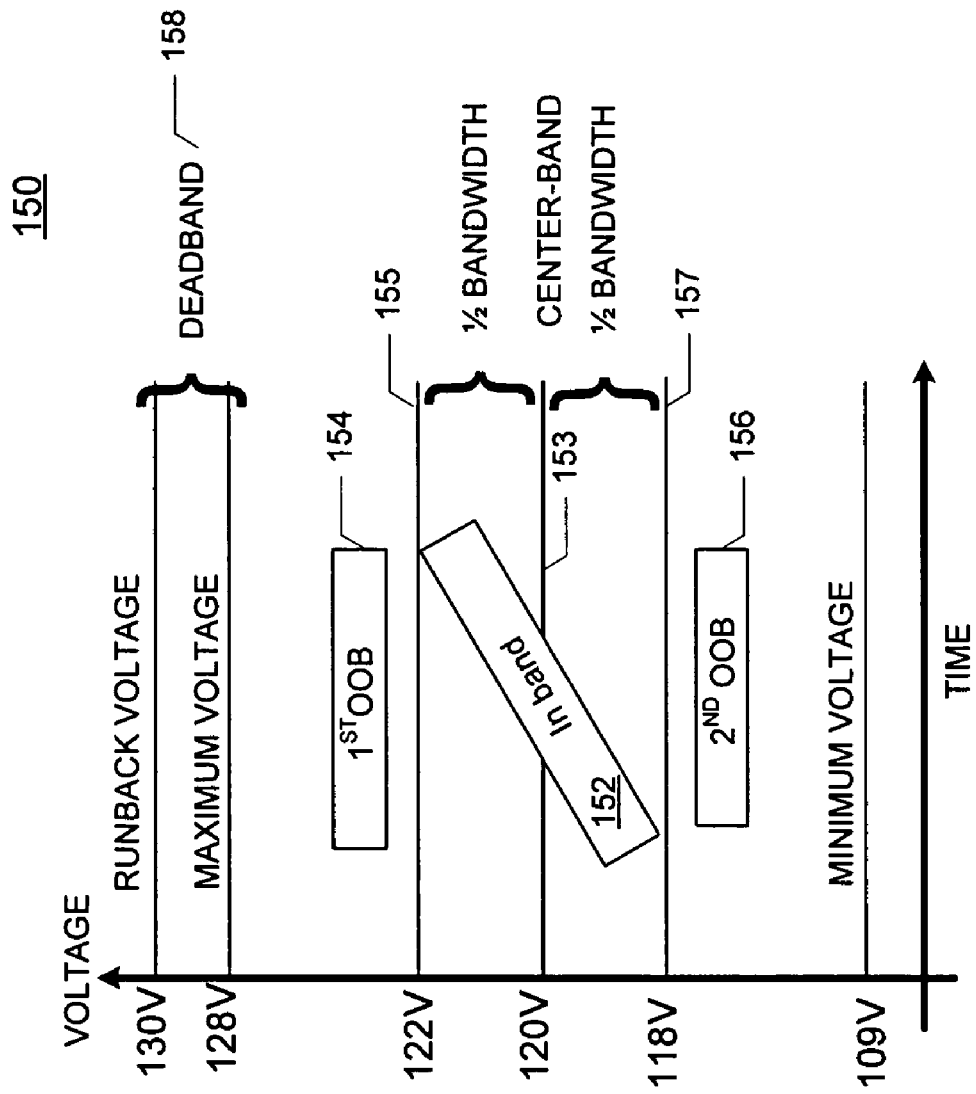
FIG. 4 is an exemplary graphic illustrating the center-band area and associated out-of-band areas that may be used by the voltage control device of FIG. 2, according to an embodiment of the invention.

As was noted above, voltage regulators generally operate via a comparison of an actual measured secondary voltage $V_{SA}$ 46 to some internal fixed reference voltage, typically the center-band voltage 153. FIG. 4 is an exemplary graphic 150 illustrating the in-band area 152, including the center-band voltage 153, and associated OOB areas 154, 156 that may be used by the voltage control device of 100, according to an embodiment of the invention. Although assigned voltage values for discussion purposes, it should be noted that the in-band area 152 and the first and second OOB areas 154, 156 may include different voltage values.

As illustrated, a center-band voltage 153 included within an in-band area 152 is selected to be 120 V±2V for a total in-band area width of 4 V. As a result, the first OOB area 154 begins at a first in-band/OOB edge 155 at 122V and extends upward beyond 128V, where 128V is the maximum voltage above which tap RAISE commands are suspended by the voltage control device 100. The second OOB area 156 begins at a second in-band/OOB edge 157 at 118V and extends downward beyond 109V, where 109V is the minimum voltage below which tap LOWER commands are suspended by the voltage control device 100. A deadband area 158 is established between 128V and a runback voltage of 130V in order to effect fast voltage correction because of an extreme voltage condition. When the measured secondary voltage $V_{SA}$ 46 is equal to or above the runback voltage, the voltage control device issues a tap LOWER command without any time delay.

As was also noted above, when using a well-known definite time characteristic, under conditions of the measured voltage $V_{SA}$ 46 oscillating around either of the first or second in-band/OOB edges 155, 157, the voltage control device 100 may not issue a needed tap position change command to the voltage regulator 32 due to the repeated First timer resets. While reducing voltage regulator maintenance time, the absence of needed tap position changes results in inefficient voltage regulation.

In accordance with an embodiment of the invention, provided is an adaptive time characteristic where, rather than resetting a First timer to its countdown time period $T_{S1}$ (see FIG. 6) upon a first return of the measured voltage $V_{SA}$ 46 into the in-band area 152 following a first excursion into the first OOB area 154, or a first excursion cycle, the microcontroller 130 adjusts the countdown time period $T_{S1}$ of the First timer to a new, or adjusted countdown time period $T_{SA}$ under certain circumstances. In general, the adjusted countdown time period $T_{SA}$ reflects a "dip time" $T_D$ back into the in-band area 152 and the elapsed time of $T_E$ the first excursion cycle. More specifically, upon detecting a second excursion into the first OOB area 154, and the microcontroller 130 causes the First timer to subtract from its countdown time period $T_{S1}$ both (1) the time elapsed $T_E$ between the first return into the in-band area 152 and the second excursion into the first OOB area 154 ("dip time $T_D$"), and (2) the time elapsed $T_E$ due to the first excursion cycle, if that dip time $T_D$ is less than a predetermined dip time period. Although discussed below in terms of excursions to and from the first OOB area 154, it should be noted that the adaptive time characteristic discussed herein is equally applicable to excursions to and from the second OOB area 156.

If the dip time $T_D$ of the measured voltage $V_{SA}$ 46 is less than the predetermined dip time period and if the measured voltage $V_{SA}$ 46 does return to the OOB area 154 a second time, the microcontroller 130 effectively causes the First timer to continue its countdown time period $T_{S1}$ as if the first dip had not occurred. This allows for a random voltage dip into the in-band area 152 that may have occurred due to an occasional single large load such as an arc furnace coming on-line and causing a momentary voltage dip, without delaying a needed tap position change. If the dip time $T_D$ between the first return into the in-band area 152 and the second excursion into the first OOB area 154 is greater than the predetermined dip time period however, the microcontroller 130 causes the First timer to again begin its countdown time period upon the second excursion into the first OOB area 154.

Figure 5:
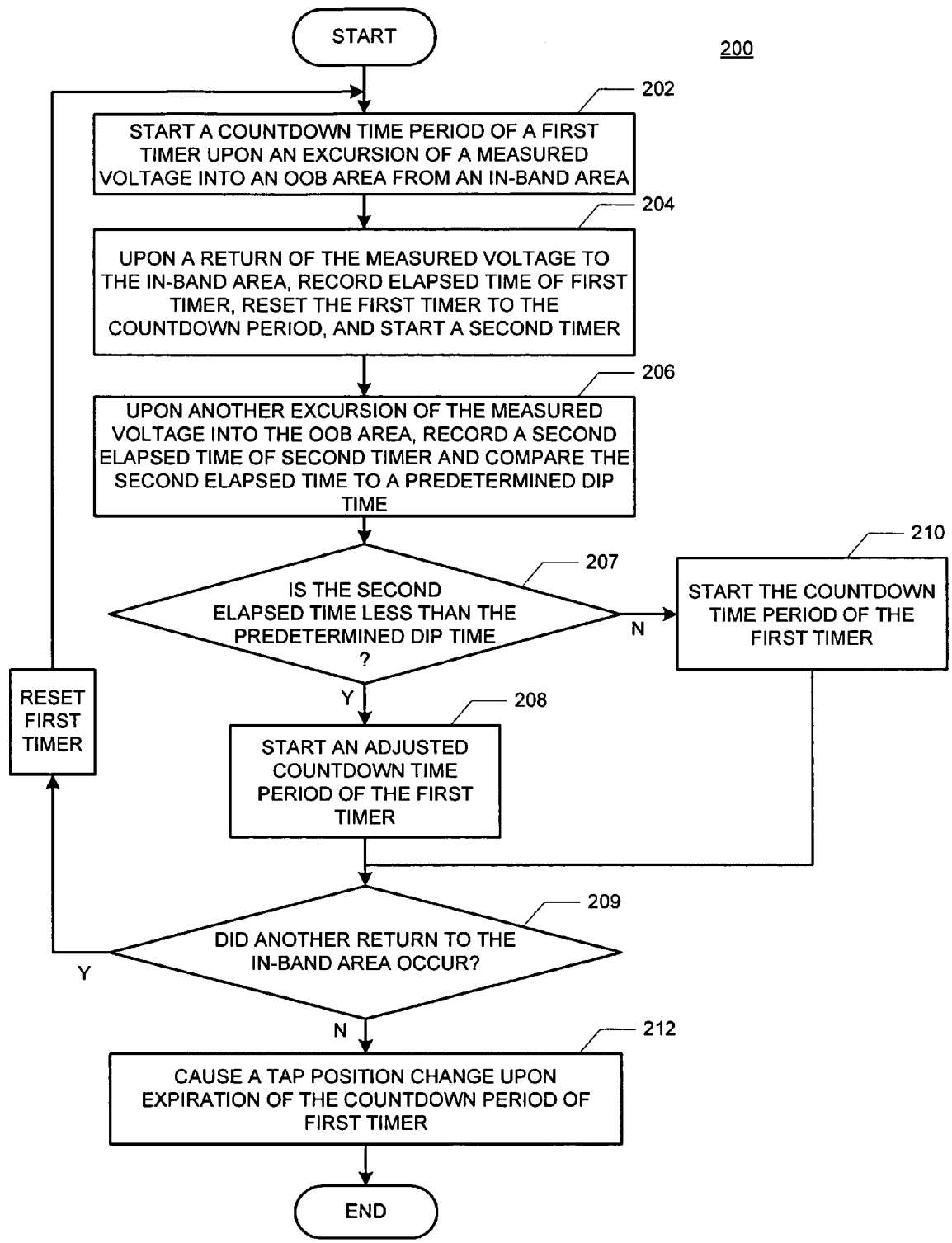
FIG. 5 is a flowchart of a method for providing an adaptive time characteristic for use by the voltage control device of FIG. 2, according to an embodiment of the invention.

FIG. 5 is a flowchart of a method 200 for providing an adaptive time characteristic for use by the voltage control device 100, according to an embodiment of the invention. Referring to FIG. 5, the method 200 begins when the microcontroller 130 starts a countdown time period $T_{S1}$ of the First timer upon detecting a first excursion of the measured voltage $V_{SA}$ 46 into the first OOB area 154 from the in-band area 152 (step 202). Upon detecting a first return of the measured voltage $V_{SA}$ 46 to the in-band area 154, the microcontroller 130 (a) records an elapsed time $T_E$ based on a time elapsed between the first excursion of the measured voltage $V_{SA}$ 46 into the first OOB area 154 and its subsequent first return into the in-band area 152, or a time elapsed during the first excursion cycle, (b) resets the First time to its countdown time period $T_{S1}$, and (c) starts a Second timer to measure a dip time $T_D$ between the first return of the measured voltage $V_{SA}$ 46 into the in-band area 152 and a second excursion into the first OOB area 154 (step 204). Upon detecting a second excursion of the measured voltage from the in-band area 152 to the first OOB area 154, the microcontroller 130 records the dip time $T_D$ (or second time elapsed time) of the Second timer, and compares the dip time $T_D$ to a predetermined dip time period (step 206).

If the dip time $T_D$ is determined to be less than the predetermined dip time period (step 207), the microcontroller 130 starts an adjusted countdown time period $T_{SA}$ of the First timer, where the adjusted countdown time period $T_{SA}$ is calculated by subtracting the elapsed time $T_E$ and the dip time $T_D$ from the adjusted countdown time period, or $T_{SA}=T_{S1}-(T_E+T_D)$ (step 208). If the dip time $T_D$ is determined to be more than the predetermined dip time period (step 207), the microcontroller 130 starts the countdown time period $T_{S1}$ of the First timer (step 210). If a second return of the measured voltage 46 to the in-band area 152 does not occur (step 209), then upon expiration of the adjusted countdown time period $T_{SA}$, the microcontroller 130 causes a tap position change of the voltage regulator (step 212). The tap position change adjusts the measured voltage $V_{SA}$ 46 from the first OOB area 154 to the in-band area 152. If a second return of the measured voltage $V_{SA}$ 46 to the in-band area 152 does occur, the microcontroller 130 causes the First timer to reset to its countdown time period $T_{S1}$. The First timer does not begin to countdown however until a subsequent excursion into the first OOB area 154 is detected.

Figure 6:
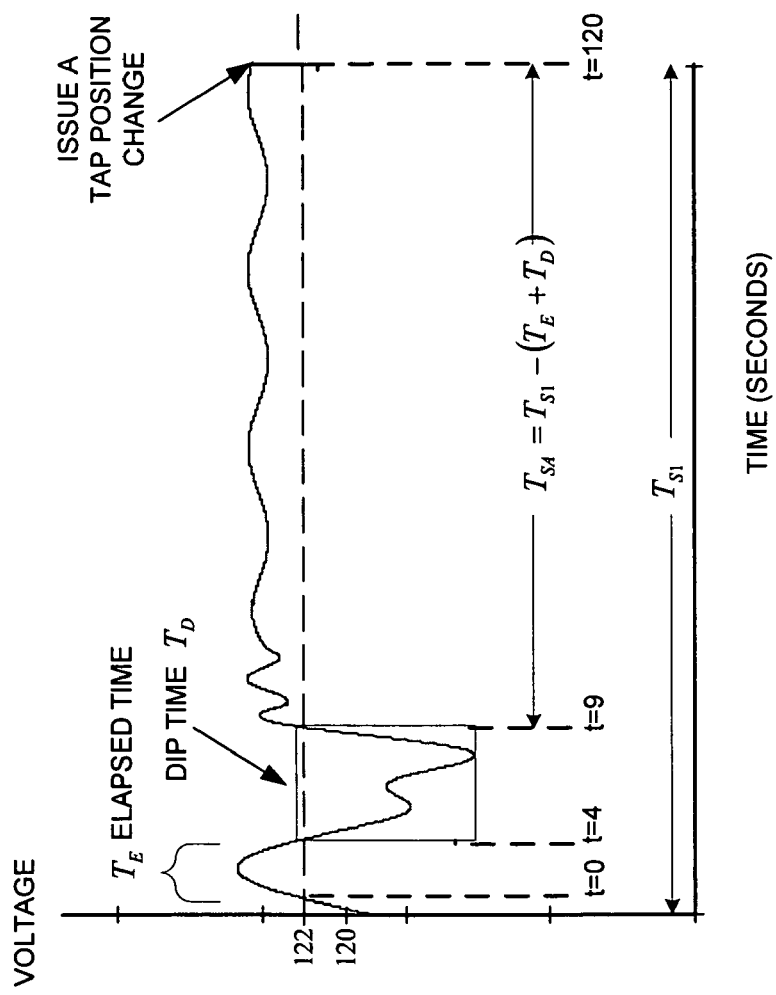
FIG. 6 is a graphical representation of the adaptive time characteristic of FIG. 5.

For example, FIG. 6 is a graphical representation 220 of the adaptive time characteristic, according to an embodiment of the invention. The graphical representation 220 is useful for describing a numerical example of the adaptive time characteristic. For ease of discussion, it will be assumed that the First timer has a countdown time period $T_{S1}$ of 120 seconds, and that the predetermined dip time period is 10 seconds.

As illustrated in FIG. 6, a First timer begins its 120 second countdown time period $T_{S1}$ upon a first excursion of the measured voltage $V_{SA}$ 46 into the first OOB area 154 at t=0. Four seconds later, the measured voltage $V_{SA}$ 46 returns to the in-band area 152, yielding an elapsed time $T_E$=4. In addition, the First timer resets to its 120 second countdown time period $T_{S1}$ again, and the Second timer begins to measure the dip time $T_D$. Five seconds later, a second excursion into the first OOB area 154 occurs at t=9, yielding a measured dip time $T_D$ of 5 seconds (via the Second timer). The First timer begins its countdown again. Because the 5 second dip time $T_D$ is less than the predetermined dip time period of 10 seconds, the First timer uses an adjusted time setting $T_{SA}$ of 111 seconds (i.e., (120 seconds)−(4 seconds+5 seconds)=111 seconds), effectively allowing the First timer to "ride through" the 5 second voltage dip into the in-band area 152. Upon expiration of the adjusted countdown time period $T_{SA}$ of the First timer, the microcontroller 130 causes a tap position change at t=120 seconds. Alternatively, in a case where the measured dip time $T_D$ is greater than the predetermined dip time period, for example, 11 seconds, the microcontroller 130 causes a tap position change at t=120 seconds from the second start of the First timer, or t=131 seconds from the first start of the First timer.

Figure 7:
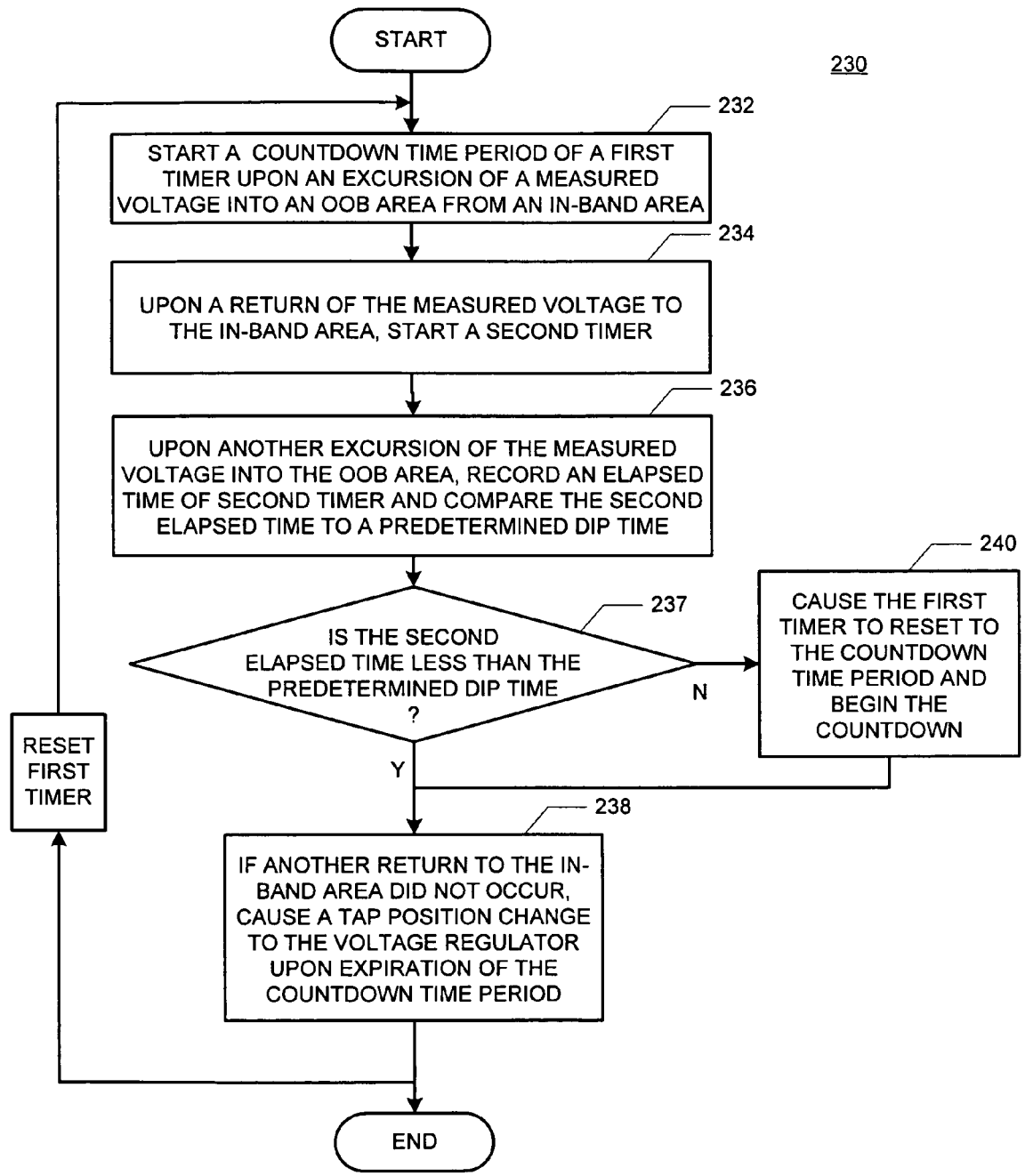
FIG. 7 is another flowchart of a method for providing an adaptive time characteristic for use by the voltage control device of FIG. 2, according to an embodiment of the invention.

The adaptive time characteristic may also be provided without stopping the countdown time period of the First timer upon each return of the measured voltage $V_{SA}$ 46 to the in-band area 152 following an excursion of the measured voltage $V_{SA}$ 46 into the first OOB area 154. For example, FIG. 7 is a flowchart of another method 230 for providing an adaptive time characteristic for use by the voltage control device 100, according to an embodiment of the invention. Referring to FIG. 7, the method 230 begins when the microcontroller 130 starts a countdown time period $T_{S1}$ of the First timer upon detecting a first excursion of the measured voltage $V_{SA}$ 46 into the first OOB area 154 (step 232). Upon detecting a first return of the measured voltage $V_{SA}$ 46 to the in-band area 154, the microcontroller 130 continues the First timer countdown and starts the Second timer to measure a dip time $T_D$ between the first return into the in-band area 152 and a second excursion into the first OOB area 154 (step 234).

Upon detecting a second excursion of the measured voltage $V_{SA}$ 46 from the in-band area 152 to the first OOB area 154, the microcontroller 130 records the dip time $T_D$ of the Second timer, and compares the dip time $T_D$ to a predetermined dip time period (step 236). If the dip time $T_D$ is determined to be less than the predetermined dip time period (step 237), the microcontroller 130 ignores the dip and continues the First timer countdown, as if the dip never occurred. If a second return of the measured voltage $V_{SA}$ 46 to the in-band area 152 is not detected prior to expiration of the countdown time period, the microcontroller 130 causes a tap position change of the voltage regulator upon expiration of the countdown time period (step 238). The tap position change adjusts the measured voltage $V_{SA}$ 46 from the first OOB area 154 to the in-band area 152. If the dip time $T_D$ is determined to be more than the predetermined dip time period (step 237), the microcontroller 130 causes the First timer to reset and begin the countdown time period (step 240). If a second return of the measured voltage $V_{SA}$ 46 to the in-band area 152 does occur, the microcontroller 130 causes the First timer to reset to its countdown time period. The First timer however, does not begin its countdown time period until the microcontroller 130 detects a subsequent excursion into the first OOB area 154 is detected.

In accordance with yet another embodiment of the invention, provided is a percentage time characteristic where, rather than terminating the countdown time period $T_{S1}$ of the First timer at the end of each excursion cycle in the first OOB area 154, the microcontroller 130 causes the countdown to continue. Further, based on a plurality of measured voltage samples taken over a selected time period (e.g., a first countdown time period), the microcontroller 130 calculates a percentage of time of the countdown time period $T_{S1}$ for which the measured voltage $V_{SA}$ 46 is in the first OOB area 154, or calculates the measured percentage time. The measured percentage time is then compared to a first threshold percentage time value to determine whether a tap position change is needed at the end of a countdown time period. In some cases, the measured percentage time is also compared to a second threshold percentage time value.

Although described in terms of the first OOB area 154 for ease of discussion, it should be noted that the percentage time characteristic is applicable to a percentage of time during the countdown time period that the measured voltage $V_{SA}$ 46 is in the second OOB area 156 below the in-band area 152, or the percentage of time during the countdown time period that the measured voltage $V_{SA}$ 46 is in the in-band area 152. Further, although the first and second threshold percentage time values are selected as a percentage of time that the measured voltage $V_{SA}$ 46 is in the first OOB area 154, the first and second threshold percentage time values may be based on other percentages such as a percentage of time the measured voltage $V_{SA}$ 46 is in the in-band area 152 or in the second OOB area 156, etc. In addition, although exemplified using first and second threshold percentage time values, it is contemplated that only one threshold percentage time value may be used to determine whether a tap position change is required.

Figure 8A:
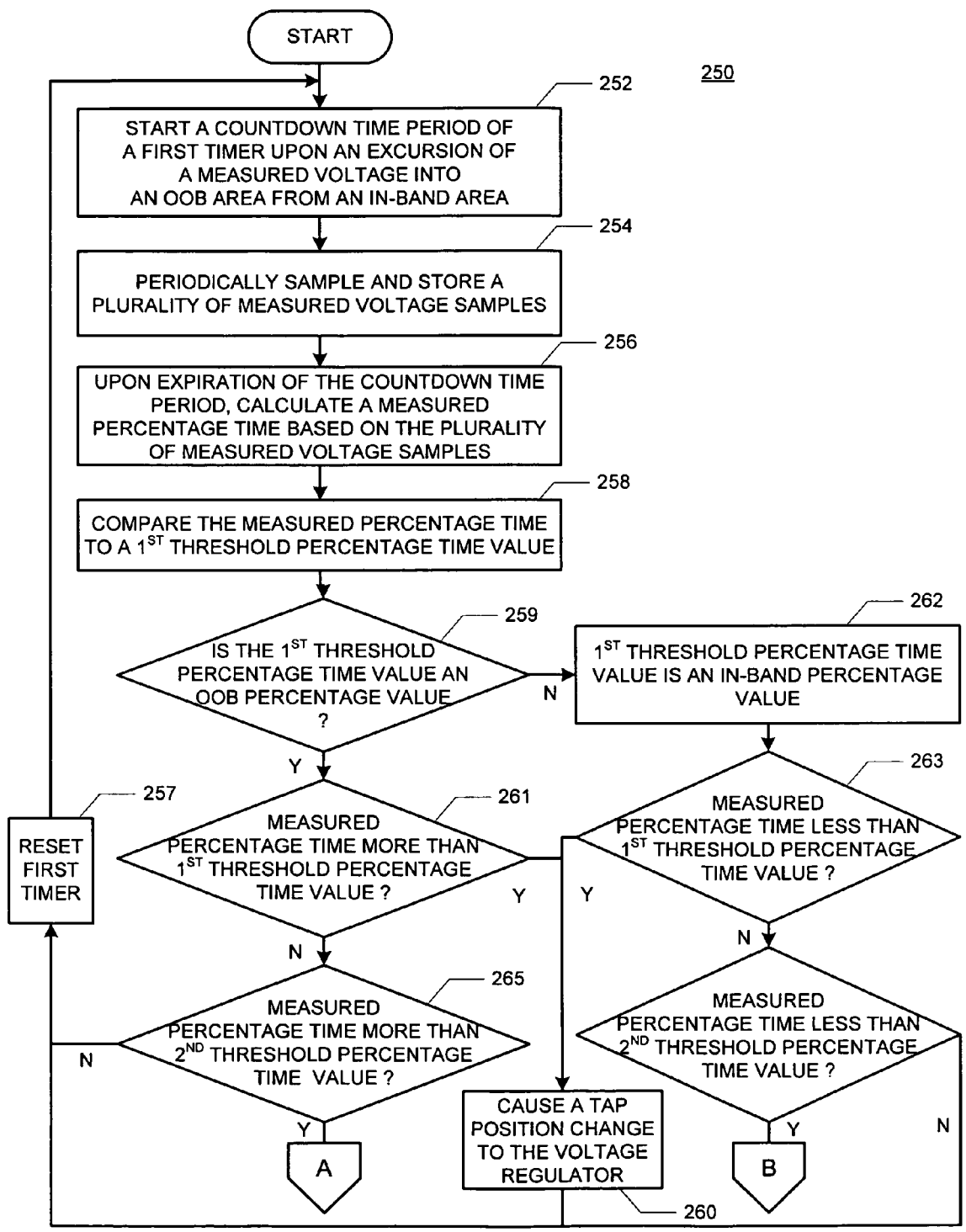
FIGS. 8A, 8B and 8C are a series of flowcharts of a method for providing a percentage time characteristic for use by the voltage control device of FIG. 2, according to an embodiment of the invention.
Figure 8B:
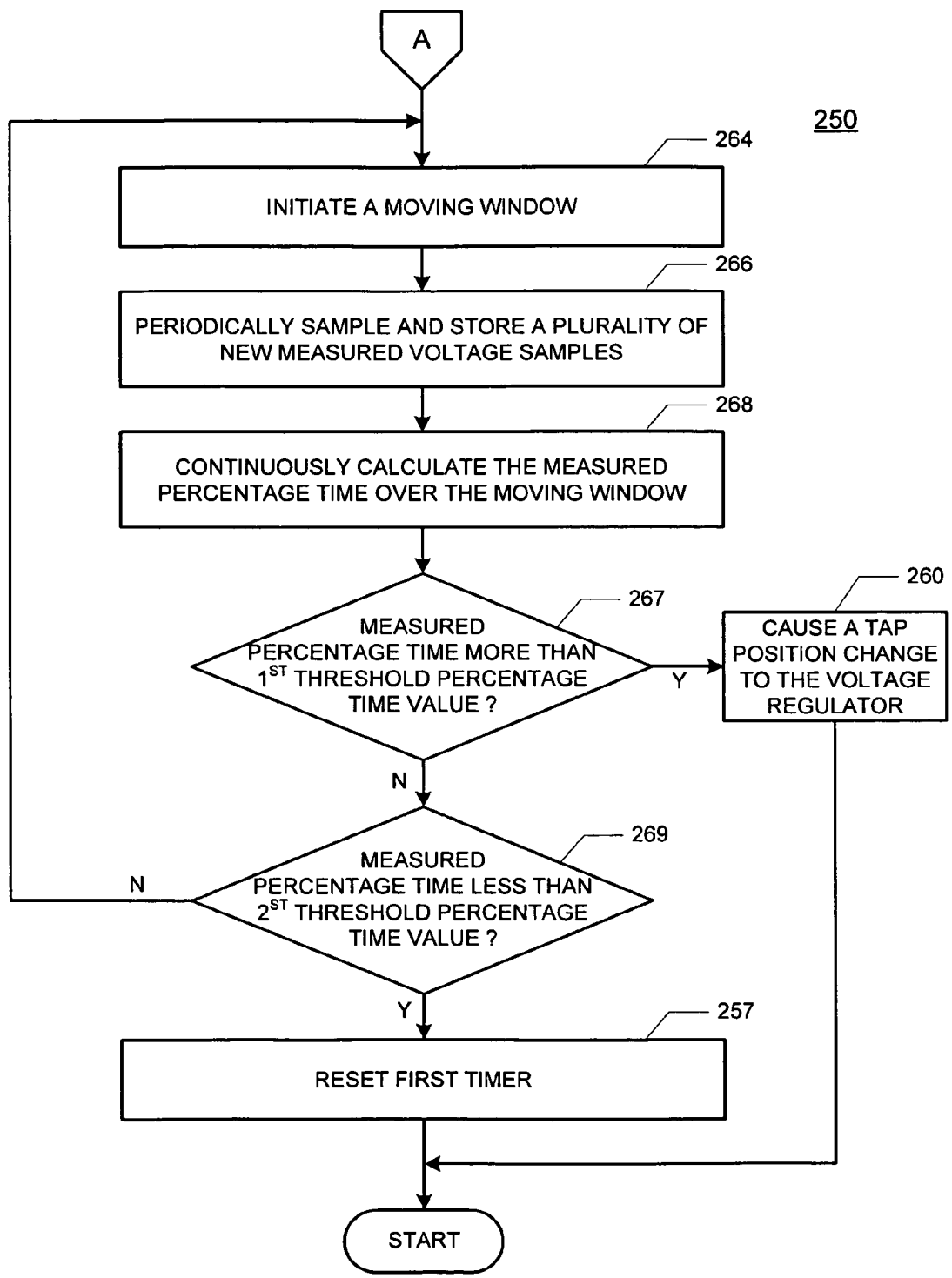
Figure 8C:
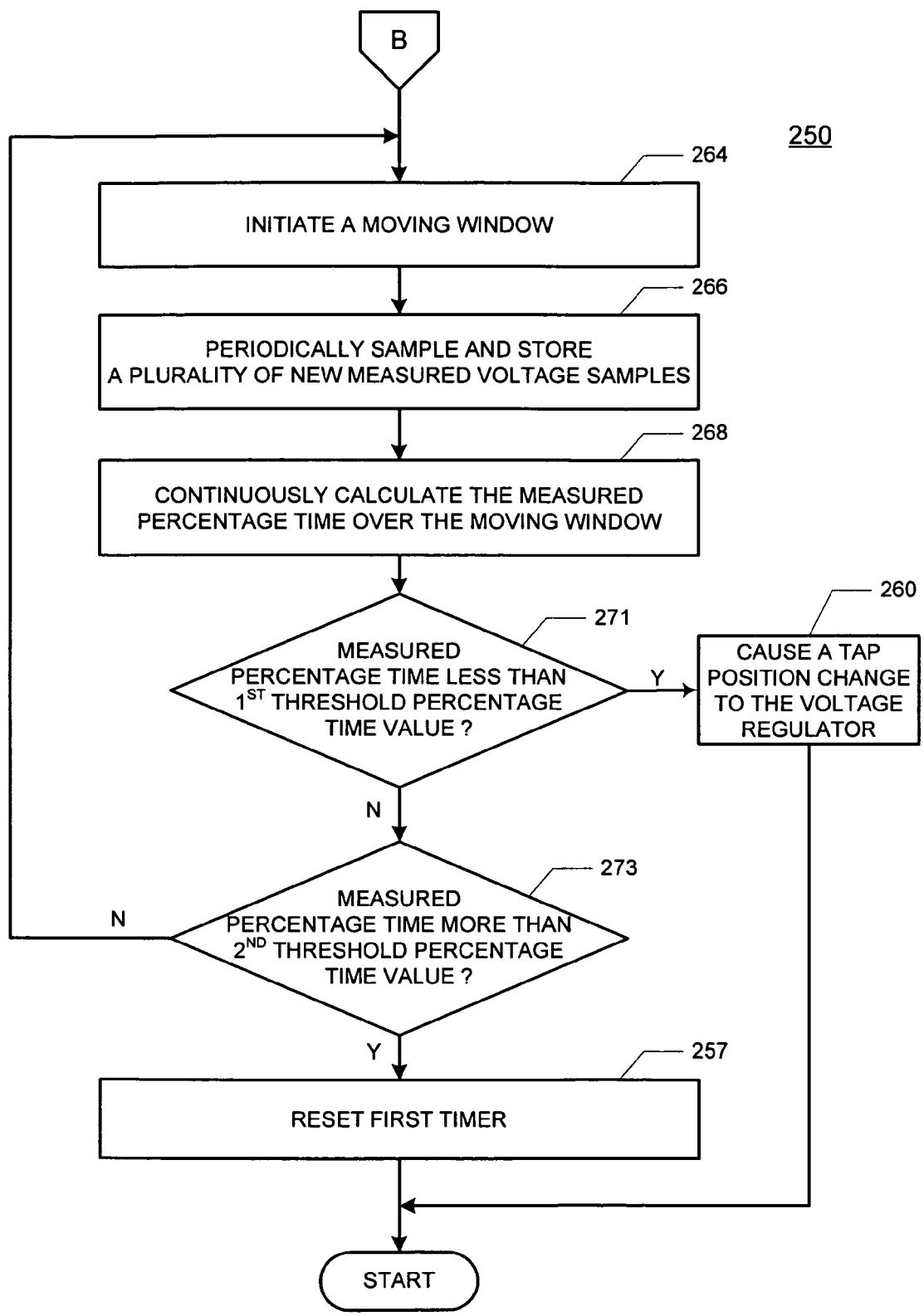

FIGS. 8A, 8B and 8C are a series of flowcharts of a method 250 for providing a percentage time characteristic for use by the voltage control device 100, according to an embodiment of the invention. The countdown time period $T_{S1}$ of the First timer is associated with a countdown window, and begins with a first excursion of the measured voltage $V_{SA}$ 46 into the OOB area 154. Unlike the definite time characteristic however, a first return into the in-band area 152 does not cause the countdown time period $T_{S1}$ to terminate. Rather, upon detecting the first excursion of the measured voltage $V_{SA}$ 46 into the OOB area 154, the microcontroller 130 causes a first countdown time period $T_{S1}$ to begin (step 252).

During the first countdown time period, the microcontroller 130 periodically samples (e.g., 2 samples per second) and stores the measured voltages $V_{SA}$ 46 as a plurality of measured voltage samples (step 254). Upon expiration of the countdown time period (i.e., at the end of the first countdown window), the microcontroller 130 calculates a measured percentage time based on the plurality of measured voltage samples (step 256). The measured percentage time is the percentage of time over the countdown time period $T_{S1}$ that the measured voltage $V_{SA}$ 46 is in the first OOB area 154. The measured percentage time may also be the percentage of time over the countdown time period $T_{S1}$ that the measured voltage $V_{SA}$ 46 (magnitude) is in the second OOB area 156. Similarly, the measured percentage time may also be the percentage of time over the countdown time period $T_{S1}$ that the measured voltage $V_{SA}$ 46 is in the in-band area 152.

Next the microcontroller 130 compares the measured percentage time to a first threshold percentage time value (step 258). The comparison is determinative of whether a tap position change is needed. For a first threshold percentage time value based on the first OOB area 154 (step 259), if the measured percentage time is more than the first threshold percentage time value, indicating that the percentage of time the measured voltage $V_{SA}$ 46 is in the first OOB area 154 exceeds what is allowable per the first threshold percentage time value (step 261), the microcontroller 130 immediately causes a tap position change of the voltage regulator to adjust the measured voltage $V_{SA}$ 46 from the first OOB area 154 to the in-band area (step 260). For example, upon detecting expiration of the First timer, the microcontroller 130 compares a measured percentage time of 83% in the first OOB area 154 to a first threshold percentage time value of 80%, and because the measured percentage time exceeds the first threshold percentage time value, the microcontroller 130 causes a tap position change.

Referring to FIGS. 8A and 8B, for a first threshold percentage time value based on the first OOB area 154, if the measured percentage time is less than the first threshold percentage time value but is greater than a second threshold percentage time value (step 265), the microcontroller 130 initiates a moving window (step 264), periodically samples and stores a plurality of new measured voltage samples of the moving window (step 266) and continuously calculates the measured percentage time as the percentage of time over a "moving countdown time period" that the measured voltage $V_{SA}$ 46 is in the first OOB area 154 (step 268). Calculation of the measured percentage time continues until the measured percentage time either (1) exceeds the first threshold percentage time value (step 267) at which time the microcontroller 130 causes a tap position change to bring the measured voltage $V_{SA}$ 46 back into the In-band area 152 (step 260), or (2) drops below the second threshold percentage time value (step 269) at which time the microcontroller 130 resets the First timer (step 257). After resetting the First timer, upon a next excursion of the measured voltage $V_{SA}$ 46 into the first OOB area 154, the microcontroller 130 causes the countdown time period $T_{S1}$ of the First timer to again begin (step 252). Similarly, for cases where the measured percentage time is the percentage of time the measured voltage $V_{SA}$ 46 is in the second OOB area 156, upon a next excursion of the measured voltage $V_{SA}$ 46 into the second OOB area 156, the microcontroller 130 causes the countdown time period $T_{S1}$ of the First timer to again begin.

Referring again to FIG. 8A, for a first threshold percentage time value based on the in-band area 152 (step 262), if the measured percentage time is less than the first threshold percentage time value (step 263), indicating that the percentage of time the measured voltage $V_{SA}$ 46 is in the in-band area 156 is less than what is required per the first threshold percentage time value, the microcontroller 130 immediately causes a tap position change of the voltage regulator to adjust the measured voltage $V_{SA}$ 46 from the out-of-band area to the in-band area (step 260). For example, upon detecting expiration of the First timer, the microcontroller 130 compares a measured percentage time of 13% in the in-band area 152 to a first threshold percentage time value of 20%, and because the measured percentage time is less the first threshold percentage time value, the microcontroller 130 causes a tap position change.

Referring to FIG. 8C, for a first threshold percentage time value based on the in-band area 152, if the measured percentage time is more than the first threshold percentage time value (e.g., 20%) but is less than a second threshold percentage time value (e.g., 25%), the microcontroller 130 initiates a moving window (step 264), periodically samples and stores the measured voltages (step 266) and continuously calculates the measured percentage time as the percentage of time over the moving countdown time period that the measured voltage $V_{SA}$ 46 is in the in-band area 152 (step 268). Calculation of the measured percentage time continues until the measured percentage time either (1) drops below the first threshold percentage time value (step 271) at which time the microcontroller will cause a tap position change to bring the measured voltage $V_{SA}$ 46 back into the In-band area 152 (step 260), or (2) exceeds the second threshold percentage time value (step 273) at which time the microcontroller resets the First timer (step 257). After the measured percentage time either drops below the first threshold percentage time value or exceeds the second threshold percentage time value, upon a next excursion of the measured voltage $V_{SA}$ 46 into the first OOB area 154 (or the second OOB area 156), the First timer again begins its countdown time period $T_{S1}$ (step 252).

In an embodiment, the moving window includes present and past measured voltage samples over a time period equivalent to the countdown time period of the First timer, or the moving countdown time period. It is contemplated however that the moving window may include present and past measured voltage samples over a time period different from the countdown time period of the First timer.

For example, if at the expiration of the First timer at 120 seconds, the microcontroller 130 determines that the measured percentage time is less than the first threshold percentage time value but is greater than first threshold percentage time value, a moving window that includes measured voltage samples generated during a 120 second period, begins. Thus at 2 samples per second and at 122 seconds, the moving window includes 240 measured voltage samples generated between 2 seconds following the start of the First timer countdown time period and two seconds following expiration of the First timer countdown time period. Similarly, at 123 seconds, the moving window includes 240 measured voltage samples generated between 3 seconds following the start of the First timer countdown time period and 3 seconds following expiration of the First timer countdown time period.

As noted above, for first the microcontroller 130 continues to calculate the measured percentage time until the measured percentage time either (1) exceeds the first threshold percentage time value or (2) drops below the second threshold percentage time value. For example, if the first threshold percentage time value is 80% and the second threshold percentage time value is 60%, and the measured percentage time is 70% at the end of the countdown time period $T_{S1}$, the microcontroller 130 initiates a moving window and then begins to continuously calculate the measured percentage time as the percentage of time over the moving countdown time period that the measured voltage $V_{SA}$ 46 is in the first OOB area 154 (or in the second OOB area 156).

If at, for example, 152 seconds, the measured percentage time is 80.01% thereby exceeding the first threshold percentage time value of 80%, the microcontroller 130 causes a tap position change to adjust the measured voltage $V_{SA}$ 46 from the first OOB area 154 to the in-band area 152. The measured percentage time of 80.01% indicates that 80.01% of the time over the 120 second moving window, the measured voltage samples were in the first OOB area 154 (or exceeded the in-band/OOB edge 155) and in the in-band area 152 only 19.99% of the time. On the other hand, if at 152 seconds the measured percentage time is 59.99%, below the second threshold percentage time value of 60%, the First timer is reset to its countdown time period $T_{S1}$ and no tap position change occurs. The measured percentage time of 59.99% indicates that 59.99% of the time over the 120 second moving window, the measured voltage samples were in the first OOB area 154 (or exceeded the in-band/OOB edge 155), and in the in-band area 152 40.01% of the time. Following the First timer reset, upon detecting a next excursion of the measured voltage $V_{SA}$ 46 into the first OOB area 154, the First timer begins its countdown time period again.

In addition to periodically sampling and storing the measured voltages $V_{SA}$ 46 directly, the microcontroller 130 may further assign a binary value to the each measured voltage sample and then store the binary values. For example, the microcontroller 130 may assign and store a binary 1 for each measured voltage sample in the first OBB area 154 (or each measured voltage sample in the second OOB area 156), and may assign a binary 0 value for each measured voltage sample in the in-band area 152. Either the percentage of the binary 1 values or the percentage of the binary 0 values may then be compared to the first and second threshold percentage time values to determine whether a tap position change is needed.

Figure 9:
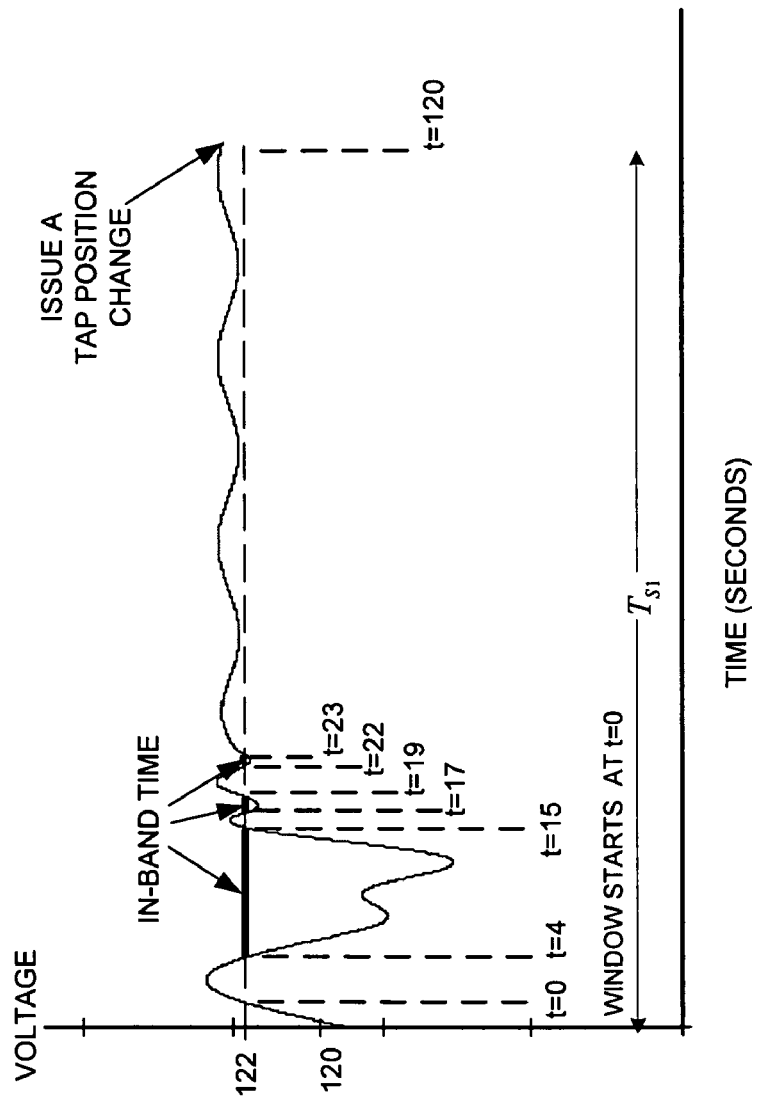
FIG. 9 is a graphical representation of the percentage time characteristic of FIG. 8.

For example, FIG. 9 is graphical representation 275 of the percentage time characteristic, according to an embodiment of the invention. The graphical representation 275 is useful for describing a numerical example of the percentage time characteristic. For ease of discussion, it will be assumed that the First timer has a countdown time period $T_{S1}$ of 120 seconds, and that a first threshold percentage time value is 80% and a second threshold percentage time value is 60%.

Implementation of the percentage time characteristic may be accomplished in one of any number of ways. For example, the voltage may be sampled periodically to form measured voltage samples that are stored in the memory 134 and then used to calculate the measured percentage time at the end of the fixed countdown window. The voltage may also be sampled periodically to form measured voltage samples that are used to continuously calculate the measured percentage time. The periodic sampling rate may be a periodic number of times per power cycle, or may be a periodic number of times per second, etc. For ease of illustration, it will be assumed that the periodic sampling rate for the measured voltage V 46 is equal to one measured voltage sample per second. It will also be assumed that a measured voltage sample above 122 V (or a measured voltage sample below 118 V) yields a binary 1 value, while a measured voltage sample equal to or between 122 V and 118 V, yields a binary 0 value. Further, the first threshold percentage time value is assumed to be 80%; that is, if 80% or more of the 120 binary values are binary 1 values (more than 96), the microcontroller 130 will cause a tap position change. The second threshold percentage time value is assumed to be 60%; that is, 60% or more of the 120 binary values are binary 1 values (more than 72).

As illustrated in FIG. 9, a First timer begins a first countdown window having a 120 second countdown time period $T_{S1}$ upon a first excursion of the measured voltage $V_{SA}$ 46 into the first OOB area 154 at t=0. Four seconds later, the measured voltage $V_{SA}$ 46 returns to the in-band area 152, marking the end of the first excursion cycle and yielding four binary 1 values and an elapsed time of 4 seconds. Eleven seconds later, the measured voltage $V_{SA}$ 46 enters the first OOB area 154 for a second time, marking the beginning of the second excursion cycle and yielding nine binary 0 values and an elapsed time of 15 seconds. Two seconds later, the measured voltage $V_{SA}$ 46 returns to the in-band area 152, marking the end of the second excursion cycle and yielding two binary 1 values and a total elapsed time of 17 seconds. Two seconds later, the measured voltage $V_{SA}$ 46 enters the first OOB area 154 for a third time, marking the beginning of the third excursion cycle and yielding two binary 0 values and an elapsed time of 19 seconds. The measured voltage $V_{SA}$ 46 remains in the first OOB area 154 for 3 seconds, returning to the in-band area 152 at 22 seconds, completing the third excursion cycle and yielding three binary 1 values. After one second and one binary 0 value, the measured voltage $V_{SA}$ 46 then returns to the first OOB area 154 for a fourth time at 23 seconds and remains there. At the end of the 120 second countdown window, the sum of the binary 1 values equals the first three excursion cycles of 9 binary 1 values plus the fourth excursion into the first OOB area, yielding 97 binary 1 values. Therefore, at 120 seconds, the microcontroller 130 causes a tap position change to lower the measured voltage $V_{SA}$ 46 because 106 binary 1 values yields a measured voltage percentage of 88%; greater than the 80% first threshold percentage time value.

Referring again to FIG. 8A, because the measured voltage percentage is greater than the first threshold percentage time value, a moving window is not initiated by the microcontroller 130. Instead, the microcontroller 130 causes a tap position change to adjust the measured voltage $V_{SA}$ 46 from the first OOB area 154 to the in-band area 152, and causes the First timer to reset back to its countdown time period.

According to a further embodiment of the invention, an average voltage characteristic is provided to enable a tap change position upon expiration of a countdown time period of the First timer if, after a first excursion into the out-of-band area, the averaged measured voltage $V_{SA}$ 46 over the countdown time period exceeds a first threshold voltage value. As with the percentage time characteristic described above, rather than terminating the countdown time period $T_{S1}$ of the First timer at the end of each excursion cycle in the first OOB area 154, the microcontroller 130 calculates an average voltage over the countdown time period $T_{S1}$ to form an averaged measured voltage value. In general, the averaged measured voltage value is then compared to the first threshold voltage value, such as the voltage value of the first in-band/OOB edge 155, at the end of the countdown time period $T_{S1}$ to determine whether a tap position change is needed. In some case, the averaged measured voltage value is also compared to a second threshold voltage value.

Although described in terms of the first OOB area 154, it should be noted that the average voltage characteristic is applicable to an averaged voltage in the second OOB area 156 below the in-band area 152, or to an averaged voltage in the in-band area 152. Further, although exemplified using first and second threshold voltage values, it is contemplated that only one threshold voltage value may be used to determine whether a tap position change is required.

Figure 10:
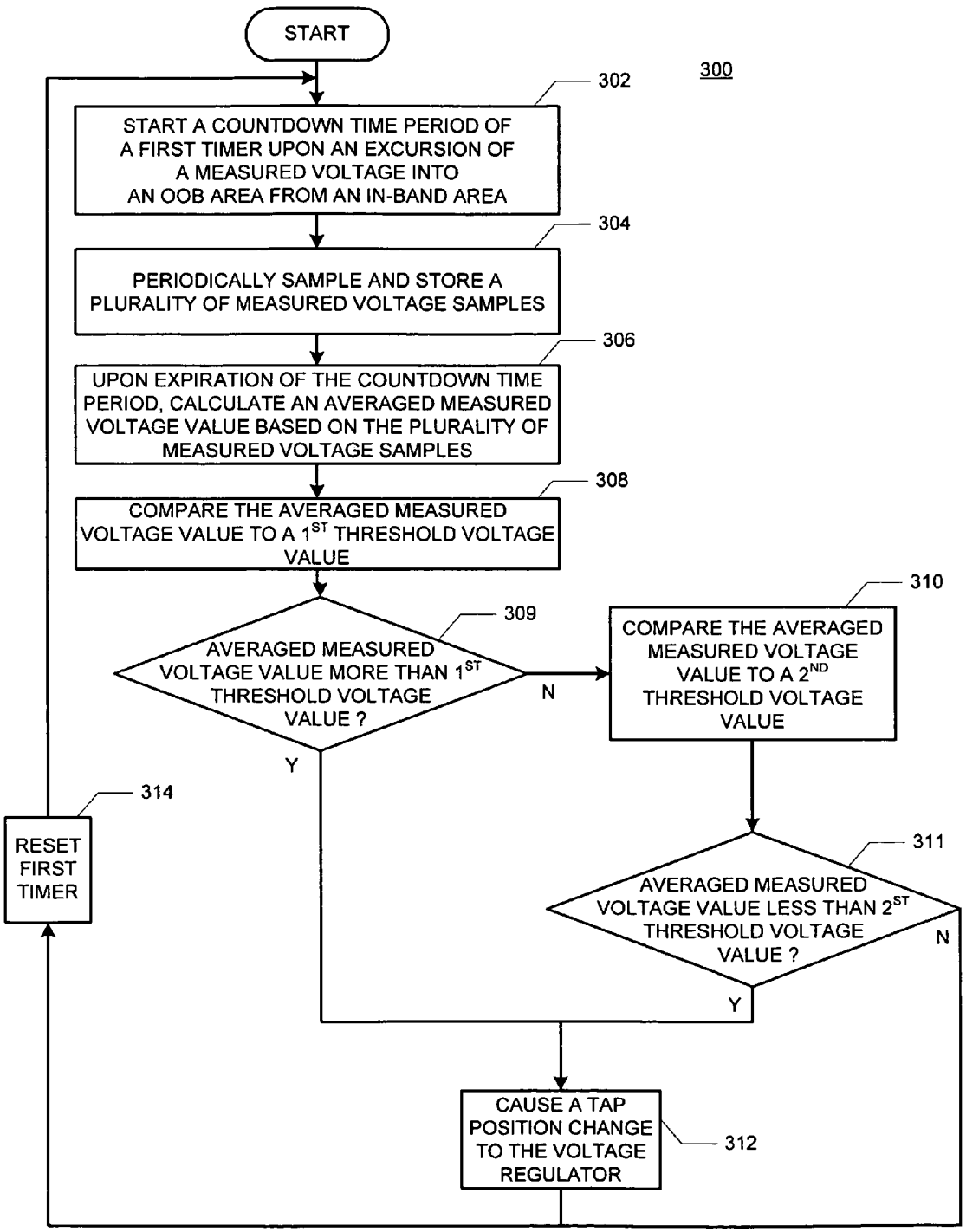
FIG. 10 is a flowchart of a method for providing an average voltage characteristic for use by the voltage control device of FIG. 2, according to an embodiment of the invention.

FIG. 10 is a flowchart of a method 300 for providing an average voltage characteristic for use by the voltage control device 100, according to an embodiment of the invention. Referring to FIG. 10, a countdown time period $T_{S1}$ is associated with a First timer, and begins with a first excursion of the measured voltage $V_{SA}$ 46 into the OOB area 154. Unlike the well-known definite time characteristic, however, a first return of the measured voltage $V_{SA}$ 46 into the in-band area 152 does not cause the countdown time period $T_{S1}$ to terminate. Rather, upon detecting a first excursion of the measured voltage $V_{SA}$ 46 into the OOB area 154 from the in-band area 152, the microcontroller 130 causes a first countdown time period $T_{S1}$ to begin (step 302). The microcontroller 130 periodically samples (e.g., four samples per power system cycle) and stores selected measured voltages (e.g., two samples per second) as a plurality of measured voltage samples representative of measured voltages $V_{SA}$ 46 of the single-phase (step 304).

In an example, the microcontroller 130 may assign a value to each of the sampled measured voltages based on an associated phasor magnitude where, for example, a measured voltage sample having a magnitude of 123 V is assigned a value of 123 and a measured voltage sample having a magnitude 119 V is assigned a value of 119, and so on. In this case, the assigned value is equal to the magnitude of the sample measured voltage however other schemes to represent the measured voltage samples may be utilized.

Referring again to FIG. 10, upon expiration of the countdown time period (i.e., at the end of the first countdown period), the microcontroller 130 calculates the averaged measured voltage value based on the plurality of measured voltage samples (step 306), and compares the averaged measured voltage value to a first threshold voltage value (step 308). Calculation of the averaged measured voltage value may include use of all of the measured voltage samples or a portion of the measured voltage samples. The comparison is determinative of whether a tap position change is needed. The averaged measured voltage value is based on a sum of the magnitudes of the plurality of measured voltage samples stored during the countdown time period, divided by the number of the plurality of measured voltage samples used. For example, if analog values are assigned to each measured voltage samples based on the sample magnitude as described above, an average of the sample magnitudes (sum of the sample magnitudes divided by the number of samples).

Although the first threshold voltage value is preferably the first in-band/OOB edge 155 (e.g., 122 V) between the first OOB area 154 and the in-band area 152, another voltage value may be used. If averaged measured voltage value is greater than the first threshold voltage value (step 309), the microcontroller 130 causes a tap position change, either immediately or after a predetermined interval (step 312). If averaged measured voltage value is not greater than the first threshold voltage value (step 309), the microcontroller 130 compares the averaged measured voltage value (step 310) to a second threshold voltage value. Although the second threshold voltage value is preferably the in-band/OOB edge 157 (e.g., 118 V) between the in-band area 152 and the second OOB area 156, another voltage value may be used.

If averaged measured voltage value is less than the second threshold voltage value (step 311), the microcontroller 130 causes a tap position change, either immediately or after a predetermined interval (step 312). If averaged measured voltage value is not less than the first threshold voltage value (step 309), the microcontroller 130 resets the First timer. The countdown time period $T_{S1}$ does not begin again until another excursion of the measured voltage $V_{SA}$ 46 into either the first or the second OOB area 154, 156 occurs.

As may be apparent from the above discussion, implementation of the apparatus and method disclosed herein enables improved voltage regulator control, especially for those cases where an occasional momentary load draw occurs or where the measured voltage $V_{SA}$ 46 oscillates around the in-band/OOB edge.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. An apparatus for controlling operation of a voltage regulator via a tap position change, the voltage regulator operatively coupled to a single-phase of a three-phase power system to regulate a measured voltage of the single-phase to an in-band area for delivery to a load, the apparatus comprising:
   a means for deriving a digitized voltage stream representative of the measured voltage of the single-phase; and
   a microcontroller operatively coupled to the means for deriving the digitized voltage stream, the microcontroller having a microprocessor and a memory operatively coupled to the microprocessor, the microcontroller being programmed to:
   start a countdown time period upon detecting a first excursion of the measured voltage from the in-band area to an out-of-band area,
   periodically sample and store the digitized voltage stream as a plurality of measured voltage samples,
   upon expiration of the countdown time period, calculate an averaged measured voltage value based on the plurality of measured voltage samples, and
   upon expiration of the countdown time period, compare the averaged measured voltage value to a first threshold voltage value, the comparison of the averaged measured voltage value to the first threshold voltage value determinative of whether the tap position change of the voltage regulator is needed.

2. The apparatus of claim 1, wherein the microcontroller is further programmed to cause the tap position change if the averaged measured voltage value is greater than the first threshold voltage value, the tap position change adjusting the measured voltage from the out-of-band area to the in-band area.

3. The apparatus of claim 1, wherein the microcontroller is further programmed to:
   compare the averaged measured voltage value to a second threshold voltage value if the averaged measured voltage value is not greater than the first threshold voltage value; and
   if the averaged measured voltage value is less than the second threshold voltage value, cause the tap position change to adjust the measured voltage from the out-of-band area to the in-band area.

4. The apparatus of claim 3, wherein the microcontroller is further programmed to cause the countdown time period to reset if the averaged measured voltage value is greater than the second threshold voltage value and less than the first threshold value.

5. The apparatus of claim 3, wherein first threshold voltage value is equal to an upper voltage of the in-band area and wherein the second threshold voltage value is equal to a lower voltage of the in-band area.

6. The apparatus of claim 1, wherein the in-band area is adjustable between a first voltage value and a second voltage value, and wherein the out-of-band area is above the first voltage value.

7. The apparatus of claim 1, wherein the in-band area is adjustable between a first voltage value and a second voltage value, and wherein the out-of-band area is below the second voltage value.

8. The apparatus of claim 1, wherein the averaged measured voltage value is equal to a sum of the magnitudes of the plurality of measured voltage samples divided by the number of the plurality of measured voltage samples.

9. A method for controlling operation of a voltage regulator via a tap position change, the voltage regulator operatively coupled to a single-phase of a three-phase power system to regulate a measured voltage of the single-phase to an in-band area for delivery to a load, the method comprising:
   deriving a digitized voltage stream representative of the measured voltage of the single-phase;
   starting a countdown time period upon detecting a first excursion of the measured voltage from the in-band area to an out-of-band area;
   periodically sampling and storing a plurality of the measured voltages as a plurality of measured voltage samples;

upon expiration of the countdown time period, calculating an averaged measured voltage value based on the plurality of measured voltage samples; and upon expiration of the countdown time period, comparing the averaged measured voltage value to a first threshold voltage value, the comparison of the averaged measured voltage value to the first threshold voltage value determinative of whether the tap position change of the voltage regulator is needed.

10. The method of claim 9, wherein the microcontroller is further programmed to cause the tap position change if the averaged measured voltage value is greater than the first threshold voltage value, the tap position change adjusting the measured voltage from the out-of-band area to the in-band area.

11. The method of claim 9, wherein the microcontroller is further programmed to:

compare the averaged measured voltage value to a second threshold voltage value if the averaged measured voltage value is not greater than the first threshold voltage value; and if the averaged measured voltage value is less than the second threshold voltage value, cause the tap position change to adjust the measured voltage from the out-of-band area to the in-band area.

12. The method of claim 11, wherein the microcontroller is further programmed to cause resetting of the countdown time period if the averaged measured voltage value is greater than the second threshold voltage value and less than the first threshold value.

13. The method of claim 11, wherein first threshold voltage value is equal to an upper voltage of the in-band area and wherein the second threshold voltage value is equal to a lower voltage of the in-band area.

14. The method of claim 11, wherein first threshold voltage value is equal to a lower voltage of the out-of-band area above the in-band area and wherein the second threshold voltage value is equal to a higher voltage of the out-of-band area below the in-band area.

15. The method of claim 9, wherein the in-band area is adjustable between a first voltage value and a second voltage value, and wherein the out-of-band area is above the first voltage value.

16. The method of claim 9, wherein the in-band area is adjustable between a first voltage value and a second voltage value, and wherein the out-of-band area is below the second voltage value.

17. The method of claim 9, wherein the averaged measured voltage value is equal to a sum of the magnitudes of the plurality of measured voltage samples stored during the countdown time period, divided by the number of the plurality of measured voltage samples.

* * * * *